Oct. 10, 1944.         E. C. TAYLOR         2,360,084
THREE-HEAT PAD
Filed June 6, 1942

INVENTOR
EDWARD C. TAYLOR
BY Clapin & Neal
ATTORNEYS

Patented Oct. 10, 1944

2,360,084

UNITED STATES PATENT OFFICE 2,360,084

THREE-HEAT PAD

Edward C. Taylor, Longmeadow, Mass., assignor to William Bradford, Taunton, Mass.

Application June 6, 1942, Serial No. 446,019

2 Claims. (Cl. 219—46)

This invention relates to heating pads and particularly to circuits therefor which make it possible to maintain three heats by means of a single thermostat.

In my prior Patent 2,237,852, April 8, 1941, I have shown a three-heat circuit of this general type which gives excellent separation of heats, and it has the additional advantage of requiring only three conductors between the pad and the switch. It is found in practice that the use of more than three conductors is frequently undesirable, rendering the connecting cord too stiff. In certain cases, however, the use of a four-conductor cord is without objection and the present invention relates to a circuit adapted to a four-wire connecting cord and which has certain features of advantage in the way of simplicity and ease of obtaining any desired separation between the several temperatures at which the pad is intended to operate.

Figure 1:
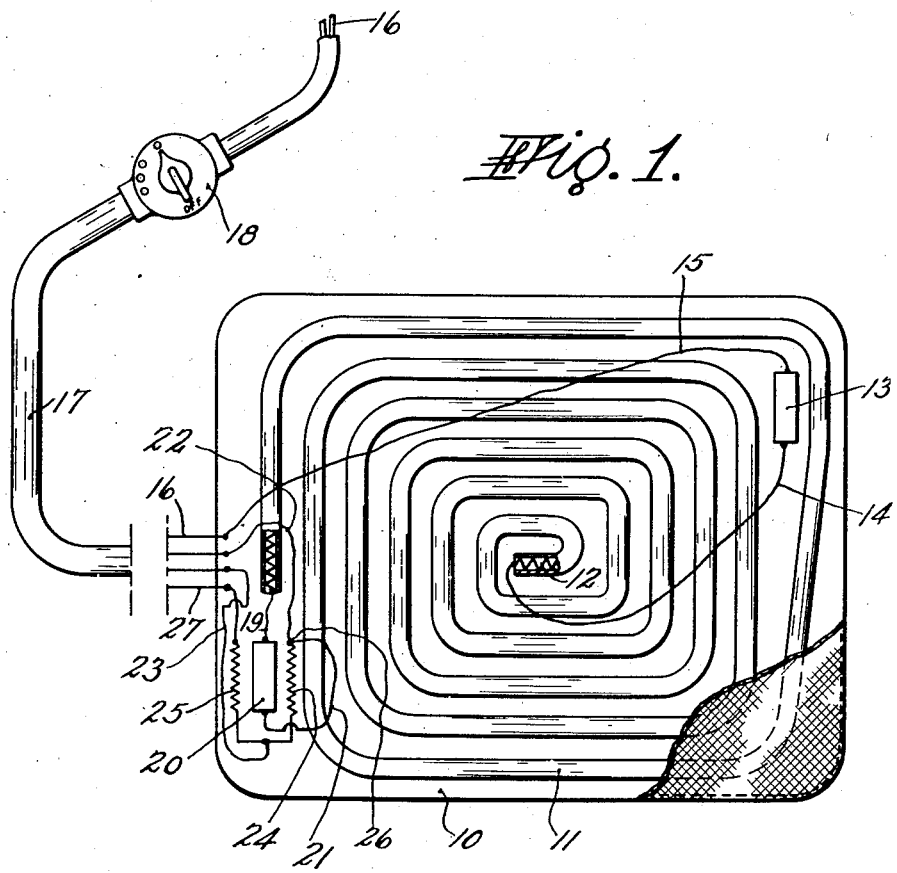
Figure 2:
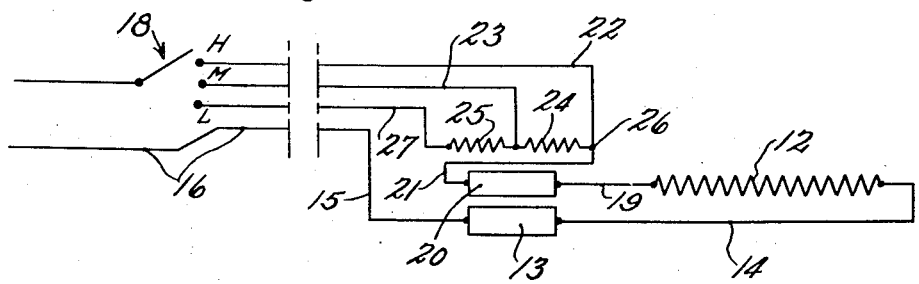

The invention will now be described in connection with the accompanying drawing, in which Fig. 1 shows a plan view of a heating pad embodying the invention with the fabric covering broken away to show the overlying asbestos covered heating coil; and Fig. 2 is a diagram of the circuit.

Sewed or otherwise secured to the pad body 10 is an asbestos covered cord having a resistance wire 12 embedded therein. One end of the resistance wire is connected to a thermostat 13 by a flexible lead 14, the other end of the thermostat being connected by a flexible lead 15 to one of the wires 16 in the cord 17 which leads to the switch 18. As indicated in Fig. 1 this wire 16 passes through the switch without making any connection therein. The thermostat 13 is simply a safety device and ordinarily takes no part in the determination of temperatures. The other end of the heating coil 12 is connected by a flexible lead 19 to a heat control thermostat 20. A flexible lead 21 from the other end of this thermostat is connected to a wire 22 leading to the contact point H of the switch 18. Extending from the contact point M of the switch is a lead 23 extending to the approximate mid-point of tandem resistances 24 and 25. These two resistances are connected to the wire 23 at their contiguous ends, and resistance 24 is connected to the wire 22 at 26. The second end of the resistance 25 is coupled by a wire 27 to the point L on the switch.

The operation of the circuit will now be considered. In the high heat position of the switch current flows through the wires 22, 21, through the thermostat 20, and through the coil 12. In this position the thermostat is subjected to the heat of coil 12 only, and not until this coil has reached this temperature (generally 180°) for which the thermostat is set is the circuit broken. In the medium position current passes through the wire 23, the resistance 24, the wire 21, and the thermostat 20, and then through the coil 12. The resistance 24 (like the resistance 25) is positioned in heat transferring relation to the thermostat 20 so that the latter will be faster than the body of the coil. This will result in the circuit being broken before the coil 12 has reached the temperature for which the thermostat is adjusted. A similar effect but in a higher degree is obtained when the switch is set on the point L since in this case the current transverses both resistances 24 and 25.

It should be borne in mind that the resistances 24, 25 are much less in value than the coil 12 so that they do not produce a great change in the total resistance of the circuit when they are introduced in series with it. In other words the current through the circuit is not greatly changed irrespective of the switch setting. This results in the heat transfer to the thermostat 20 being dependent upon the individual resistances of the resistance coils 24, 25. One set of values that has been found suitable for a voltage of 110 is 230 ohms for the coil 12 and 20 ohms each for the resistances 24, 25. It will be seen that the total resistance on high is 230 ohms, on medium 250 ohms, and on low 270 ohms. The current in each of these circuit conditions will be found by dividing 110 by the total resistance, or 0.478, 0.440 and 0.408 ampere for high, medium, and low positions respectively. The total wattage of the circuit will be 52.6, 48.4 and 45.0 in the same order, while wattage dissipated in the thermostat-heating resistances 24, 25, will be zero, 3.87 and 6.66 respectively. Since the medium and low heats are dependent upon the wattage dissipated in the thermostat-heating resistances it will be apparent that with the use of but a single thermostat the low and medium temperatures can be secured as desired merely by changing the values of the two resistances 24 and 25, as by varying their lengths until the correct value is obtained. Subsequent pads can be made from the same dimensions and will give the same spacing of heats.

What I claim is:

1. A three-heat pad comprising a heating coil, a thermostat embedded in the pad and in series therewith, a pair of resistances in heat transferring adjacency to the thermostat, a four-wire conductor running from said pad, switch means in said conductor for connecting neither, one, or both of said resistances in series with the heating coil.

2. A three-heat pad comprising a heating coil, a thermostat embedded in the pad and in series therewith, a pair of tandem resistances, one end of the tandem being connected to the side of the thermostat remote from the heating coil, a three-point switch having one point connected to said end of the tandem resistances, a second point connected to the common junction of the tandem resistances, and a third point connected to the second end of the tandem resistances, said tandem resistances being in heat transferring adjacency to said thermostat.

EDWARD C. TAYLOR.